(12) United States Patent
Lee et al.

(10) Patent No.: US 6,775,368 B1
(45) Date of Patent: Aug. 10, 2004

(54) SEAMLESS DATA NETWORK TELECOMMUNICATION SERVICE DURING MOBILE WIRELESS CALL HANDOFF

(75) Inventors: Chinmei Chen Lee, Woodbridge, IL (US); Douglas William Varney, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/337,301

(22) Filed: Jun. 21, 1999

(51) Int. Cl.[7] .............................................. H04M 3/42
(52) U.S. Cl. ........................ 379/211.02; 379/212.01; 379/221.09; 379/900; 370/352
(58) Field of Search ....................... 379/211.01, 142.01, 379/142.08, 142.17, 201.01, 211.02, 212.01, 215.01, 220.01, 221.08, 221.09, 900; 370/352, 401, 354, 355, 356

(56) References Cited

U.S. PATENT DOCUMENTS

| | | | | |
|---|---|---|---|---|
| 5,511,111 A | * | 4/1996 | Serbetcioglu et al. ... | 379/207 X |
| 5,809,128 A | * | 9/1998 | McMullin .................... | 379/215 |
| 5,946,381 A | * | 8/1999 | Danne et al. ............ | 379/215 X |
| 5,982,774 A | * | 11/1999 | Foladare et al. ......... | 379/215 X |
| 5,999,613 A | * | 12/1999 | Nabkel et al. .............. | 379/142 |
| 6,011,844 A | * | 1/2000 | Uppaluru et al. ............ | 379/266 |
| 6,097,795 A | * | 8/2000 | Ungruh et al. ........... | 379/215 X |
| 6,104,800 A | * | 8/2000 | Benson ........................ | 379/215 |
| 6,324,276 B1 | * | 11/2001 | Uppaluru et al. ....... | 379/212.01 |
| 6,366,661 B1 | * | 4/2002 | DeVillier et al. ........ | 379/900 X |
| 6,381,329 B1 | * | 4/2002 | Uppalura et al. ... | 379/212.01 X |
| 6,389,005 B1 | * | 5/2002 | Cruickshank ............... | 370/352 |

* cited by examiner

Primary Examiner—Creighton Smith
(74) Attorney, Agent, or Firm—Walter W. Duft

(57) ABSTRACT

A system and method for remote activation of customized telecommunication services are provided for data network telephony subscribers in a data network. In response to a call originator placing a call to a terminating telephony subscriber in the data network, a telephony server routes the call according to custom telecommunication service instructions provided in advance by the telephony subscriber and stored remotely from the telephony subscriber's point of presence on the data network. The call originator may be a data network telephony subscriber or a subscriber in the Public Switched Telephone Network (PSTN). The telephony server preferably performs the call routing based custom telecommunication service instructions (along with the subscriber's network address) retrieved from a subscriber profile server that maintains a subscriber profile database. A registration server may be provided to forward a data network address assigned to the telephony subscriber to the subscriber profile server when telephony service is invoked. Registration service may be provided on behalf of dial-up data network telephony subscribers in association with a network access server.

21 Claims, 3 Drawing Sheets

SEAMLESS DATA NETWORK TELECOMMUNICATION SERVICE DURING MOBILE WIRELESS CALL HANDOFF

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to the implementation of customized telecommunication services on behalf of data network telephony subscribers. More particularly, the invention pertains to a system and method for the remote activation of customized telecommunication services during periods of subscriber network connectivity and non-connectivity alike.

2. Description of the Prior Art

Data network telephony subscribers, like Public Switched Telephone Network (PSTN) subscribers, may require customized calling services during times when they are not able, or do not wish, to receive calls at their usual network call terminating location. Unlike PSTN subscribers, however, data network telephony subscribers are not always connected to the data network. For example, assume a telephony subscriber is connected to a corporate Local Area Network (LAN) that in turn connects to the Internet via a corporate gateway. A corporate communication server (e.g., a packet-based multimedia PBX system) may be further provided to establish a telephony service interface for the subscriber. This equipment is generally not as robust as the switching infrastructure of the PSTN, which after many years of operation has achieved a very high level of system reliability and availability. If the corporate gateway or corporate communication server malfunctions or is taken out of service, the telephony subscriber will not be present on the network during the period of non-connectivity.

A more profound connectivity issue exists relative to dial-up telephony subscribers. By design, dial-up telephony subscribers are disconnected each time they log off the network. In the usual case, the time period of non-connection will greatly exceed the duration of connection.

The problem of intermittent data network connectivity gives rise to a need for customized telecommunication services that can be activated to provide specialized call treatment on behalf of network telephony subscribers without regard to subscriber connection status. Existing data network telephony servers, such as Internet/PSTN gateways and network telephony proxies, do not currently provide such functionality. Although data network feature servers provide advanced call-handling services on behalf of data network telephony subscribers, such services do not currently include custom call routing on behalf of non-connected data network telephony subscribers without direct knowledge of subscriber profiles.

What is required is a system and method that can function independently of subscriber network connections and allow telephony service providers to offer uninterrupted custom call treatment regardless of subscriber connectivity.

SUMMARY OF THE INVENTION

A system and method for remote activation of customized telecommunication services for data network telephony subscribers provides a novel solution to the foregoing problem. In response to a call originator placing a call to a terminating telephony subscriber in the data network, a telephony server routes the call according to custom telecommunication service instructions provided in advance by the telephony subscriber, and stored remotely from the telephony subscriber's point of presence on the data network. For example, an attempt may first be made to setup the call to the telephony subscriber's assigned network address. Upon the telephony server being unable to establish a call connection to the telephony subscriber at the specified address, call redirection may be invoked and the call routed to an alternative destination. In other cases, an incoming call may be rerouted to a designated alternate location without first attempting a call setup to the telephony subscriber's network address. It will be appreciated that the custom telecommunication service instructions can be many and varied.

The call originator may be a data network telephony subscriber or a subscriber in a voice network such as the Public Switched Telephone Network (PSTN). For the former group, the telephony server may be a telephony proxy operating in the data network. For the latter group, the telephony server may be a data network/PSTN gateway. If desired, the telephony proxy and gateway functions may be combined on a single platform. To implement its functions, the telephony server retrieves the subscriber's custom telecommunication service instructions (along with the subscriber's network address) from a subscriber profile server that maintains a network interface on the data network. The subscriber profile server can be implemented as part of the telephony server or may be remote therefrom. This server maintains a subscriber profile database that contains the custom telecommunication service instructions for individual data network telephony subscribers, along with subscriber identification information. The subscriber identification information includes a data network address that is mapped against a Network Access Identifier (NAI). The NAI, in turn, is mapped against a provisioned telephony number. The telephony number is preferably a PSTN-dialable telephone number conforming to the ITU E.164 numbering standard. A registration procedure allows subscribers to notify the subscriber profile server that they are connected to the data network and ready to receive telephony service. A registration server can be used to provide the subscriber's current network address to the subscriber profile server during the registration process. The registration server could be co-located with the subscriber profile server, or it could be located at any other point in the data network. If the telephony subscriber has dial-up network connectivity, the registration server could be co-located with, and part of, the telephony subscriber's network access server. The network access server would normally be remote from the (telephony) subscriber profile server, unless the telephony service provider is also the network access provider, which could be the case in the future as data network service providers expand and diversify.

BRIEF DESCRIPTION OF THE DRAWING

The foregoing and other features and advantages of the invention will be apparent from the following more particular description of a preferred embodiment of the invention, as illustrated in the accompanying Drawing, in which.

DETAILED DESCRIPTION OF THE PREFERRED EMBODIMENT

Figure 1:
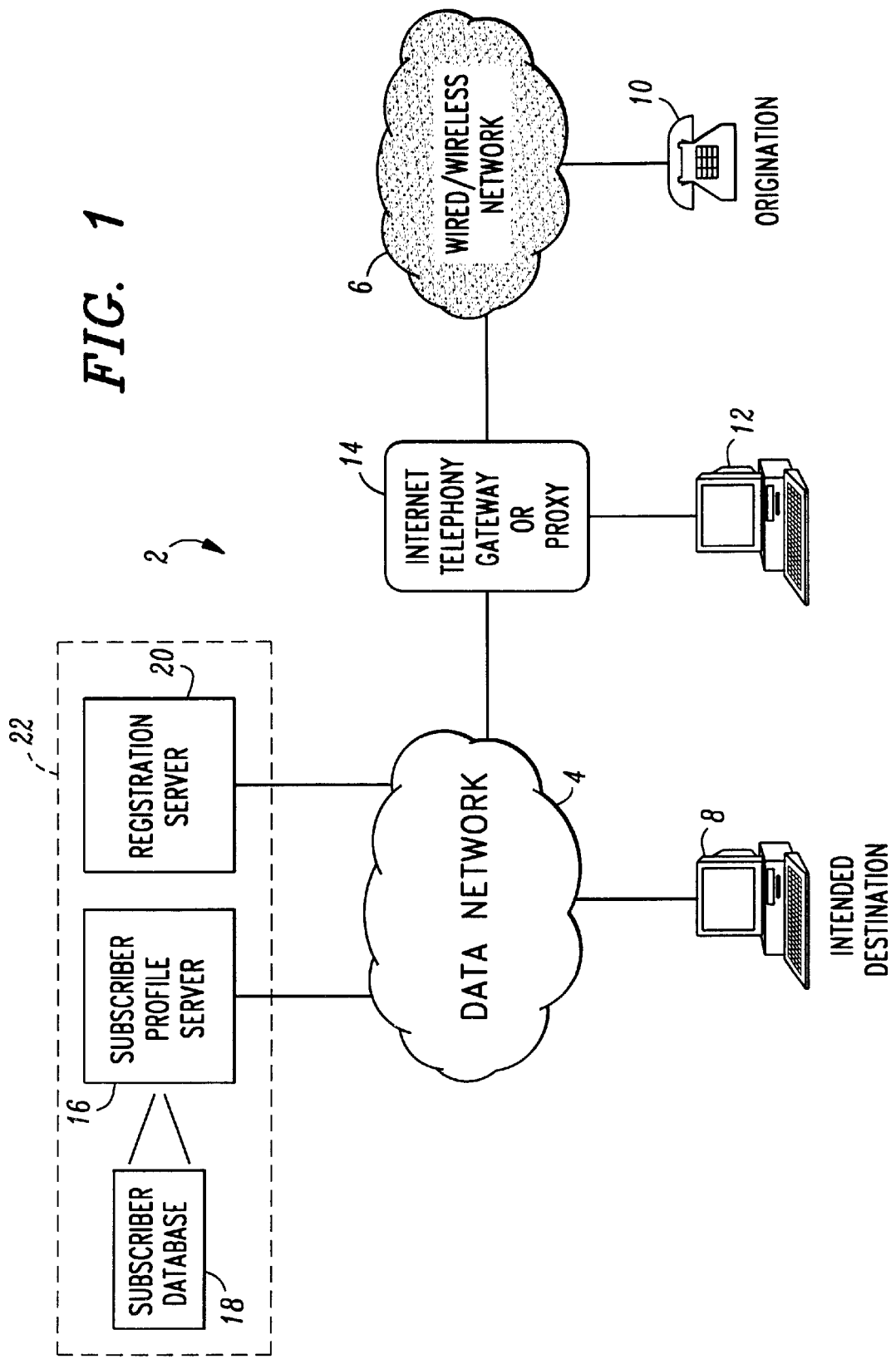
FIG. 1 is a block diagram showing relevant elements of an exemplary telecommunication system for routing telephone calls in accordance with the invention between a wireline subscriber in the PSTN and a data network telephony subscriber.

Turning now to the figures, like reference numerals are used to represent like elements in all of the several views. FIG. 1 illustrates an exemplary telecommunication system 2 for routing telephone calls between telephony subscriber devices in a computer data network 4, such as the Internet, or between data network telephony subscriber devices and telephony subscriber devices in a wireline (or wireless) voice network 6, such as the PSTN. More particularly, FIG. 1 illustrates a data network telephony subscriber device 8 (e.g. a voice telephony-capable computer terminal), a PSTN subscriber device 10 (e.g., a telephone), and another data network telephony subscriber device 12 (e.g., a voice telephony-capable computer terminal). It is assumed that the data network telephony subscriber device 8 represents the intended call destination and that the PSTN subscriber device 10 and the data network subscriber device 12 represent call originators. In accordance with the invention, calls originated by the subscriber devices 10 and 12 are processed by a telephony server 14. The telephony server 14 may be incorporated as part of a telephony gateway (for PSTN connectivity), a data network telephony proxy, or a platform that serves as both a telephony gateway and proxy. As is known, telephony gateways and proxies are programmable data processing platforms that operate as network hosts, and which are programmed to route telephony traffic across and between networks based on dialed telephony numbers and network address look-ups. Persons skilled in the art will recognize that the programming of such apparatus can be readily modified to implement the functions of the telephony server 14 described herein.

Also incorporated in the data network 4 is at least one subscriber profile server 16 that maintains a subscriber profile database 18. The subscriber profile server 16 could be implemented, by way of example only, as a specialized data network Service Control Point (SCP). Alternatively, it could be implemented using a PSTN SCP that is augmented with one or more network interfaces to the data network 4. As is known, an SCP is a programmed data processing platform that manages a database containing call handling information for telephony subscribers. An SCP responds to connection query requests by providing call connection information retrieved from its database.

In addition to the subscriber profile server 16 and the subscriber database 18, at least one data network telephony registration server 20 may be provided in the data network 4. The registration server 20 is preferably implemented as programmed data processing apparatus that maintains at least one network interface on the data network 4. The dashed line 22 around the subscriber profile server 16, the subscriber database 18 and the registration server 20 signifies that these functional components could be co-located on the same computer platform. Alternatively, the registration server 20 could be co-located with, and part of, a dial-up network access server (not shown).

The telephony server 14 implements the call routing functions of the invention. It does this using customized telecommunication service instructions (described in more detail below) maintained by the subscriber profile server 16. These instructions may be specific to individual telephony subscribers or to a group of telephony subscribers, such as a corporate department or work group. They can be uploaded to the subscriber profile server 16 in a manner now to be described.

When a data network telephony subscriber first subscribes for telephony service, the telephony service provider requires the subscriber to provide basic information, such as the subscribers name and email address, together with the one or more custom telecommunication service instructions. The telephony service provider then assigns a Network Access Identifier (NAI) and provisions a telephony number, which is preferably a PSTN-dialable number in accordance with the ITU E.164 standard. The NAI and the telephony number for a given subscriber, along with the custom telecommunication service instructions, are stored at a designated subscriber profile server, such as the subscriber profile server 16. Additional subscriber profile servers may be provided to service other telephony subscriber devices. If desired, subscriber profile servers could also be operated as mirrored pairs, to provide redundancy.

Once the telephony subscriber is provisioned for service with the telephony service provider, a registration procedure is invoked by software or firmware in the subscriber's telephony subscriber device each time a data connection is initiated to the data network 4, e.g., by logging on to a data processing terminal connected to a LAN, dialing in to a network service provider, or the like. During registration, the telephony subscriber device contacts a registration server, such as the registration server 20, and transmits the telephony subscriber's NAI, which is either pre-stored in the telephony subscriber device or entered therein by the telephony subscriber. The registration server also receives, or is pre-provided with, or itself generates, a current valid network address for the telephony subscriber device. Whatever the case may be, the registration server forwards the telephony subscriber's NAI and the network address of the telephony subscriber device to the subscriber profile server that maintains database information for the telephony subscriber. If the data network telephony subscriber device initiates a dial-up connection that results in a dynamic network address allocation, the NAI and network address are provided to the subscriber profile server after the network address is dynamically allocated.

As stated above, registration servers could be co-located with subscriber profile servers. Registration servers could also reside at other locations in the data network 4. For example, as also stated above, if a telephony subscriber has dial-up access to the data network 4, a registration server could be co-located with, and part of, the subscriber's network access server.

Figure 2:
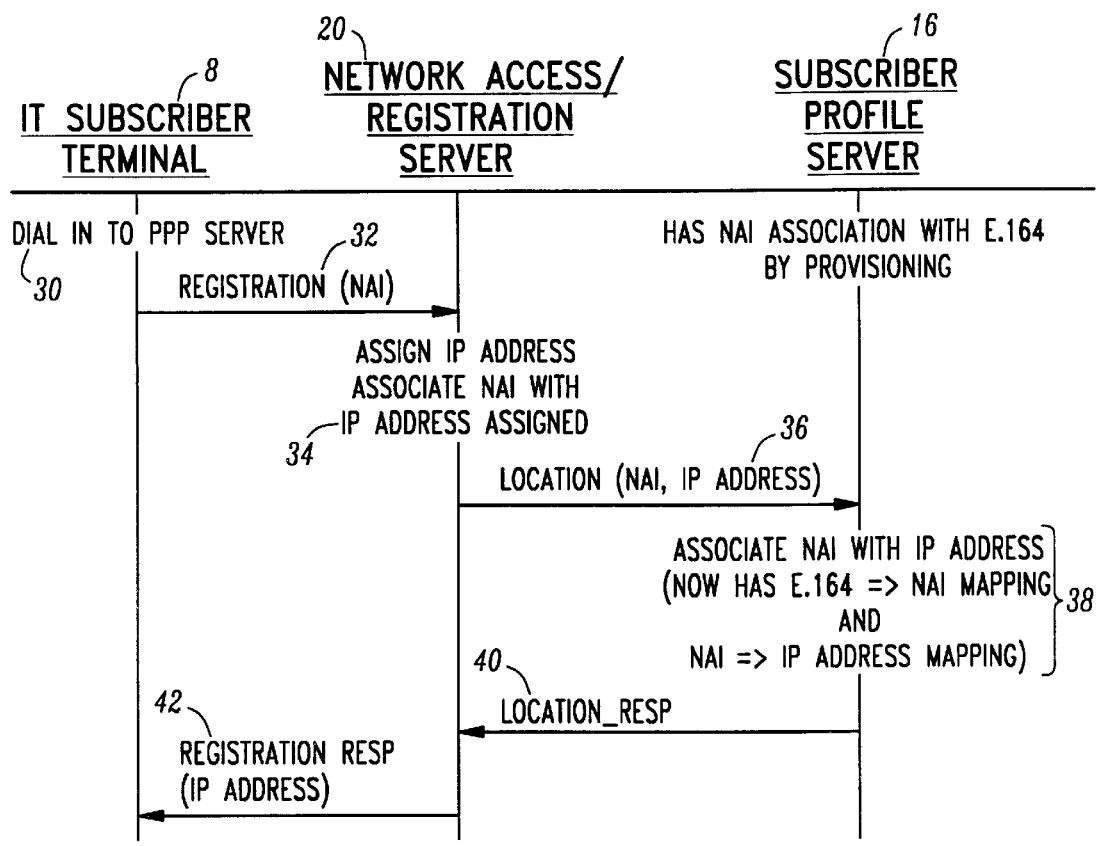
FIG. 2 is a messaging sequence diagram showing a series of registration steps implemented in accordance with an exemplary embodiment of the invention in the telecommunication system of FIG. 1.

FIG. 2 illustrates a sequence of registration steps that can be implemented in accordance with the present invention to register the data network subscriber device 8 with the registration server 20 and the subscriber profile server 16 of FIG. 1. In particular, FIG. 2 illustrates details of a registration sequence implemented on behalf of a dial-up telephony subscriber. Still more particularly, the telephony subscriber device 8 is assumed to be logging on to the data network 4 and registering for telephony service as part of a dial-up network session.

In a first step 30, the telephony subscriber device 8 initiates a registration procedure by dialing the subscriber's network access provider and establishing communication using an appropriate protocol, such as PPP. In step 32, the telephony subscriber device 8 transmits the telephony subscriber's NAI, such as a domain name, to the network access server, which for purposes of the example of FIG. 2 is assumed to have the registration server 20 incorporated therein. In step 34 the registration server 20 allocates a data network address (e.g., an IP address) to the telephony subscriber device 8, and associates the network address with the telephony subscriber's NAI.

In step 36, the registration server 20 sends the NAI and allocated network address to the subscriber profile server 16 as part of a location identification message. In step 38, the subscriber profile server 16 consults its subscriber database 18 and associates the NAI with the allocated network address. Again, it is assumed that the NAI and telephony number of the telephony subscriber have been previously stored in the subscriber profile database 18, along with the subscriber's custom telecommunication instructions, during initial provisioning for telephony service. As described above, the telephony number is preferably based on the conventional ITU E.164 numbering standards, and is thus dialable using standard telephone equipment.

As a result of the foregoing registration steps, it can be seen that there will exist within the subscriber profile server 16 a mapping between the telephony number and the NAI of the telephony subscriber utilizing the telephony subscriber device 8, and a mapping between the telephony subscriber's NAI and the data network address allocated to the telephony subscriber device 8. In step 40, a location response message is returned from the subscriber profile server 16 to the registration server 20 to indicate successful registration. In step 42, a registration response message is sent by the registration server 20 to the telephony subscriber device 8. This message provides the telephony subscriber device 8 with the allocated data network address and advises that registration was successful.

Figure 3:
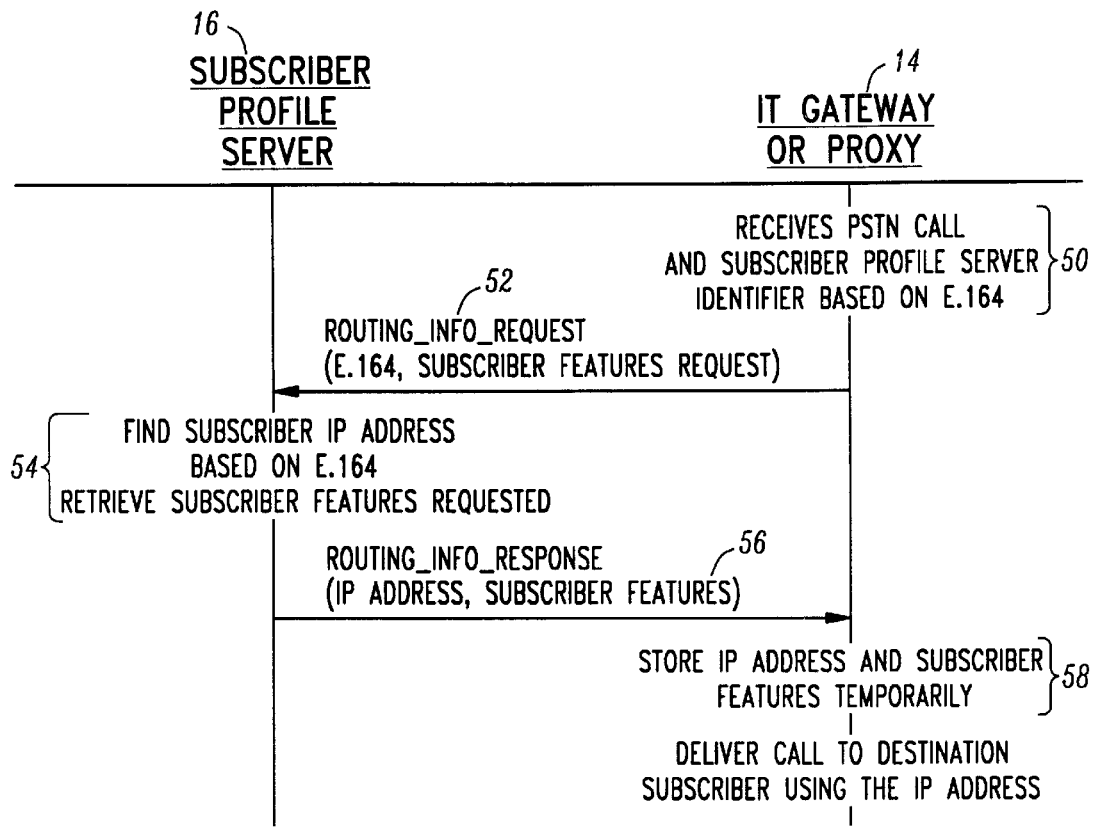
FIG. 3 is a messaging sequence diagram showing a series of call setup steps implemented in accordance with an exemplary embodiment of the invention in the telecommunication system of FIG. 1.

Turning now to FIG. 3, a sequence of steps is illustrated for performing call setup on behalf of the telephony subscriber device 8 in accordance with one possible implementation of the invention. In step 50, the telephony server 14 is assumed to receive a call from the PSTN subscriber device 10, or the telephony subscriber device 12, for the telephony number of the telephony subscriber using the telephony subscriber device 8. Using pre-stored information, the telephony server 14 correlates the telephony number to an appropriate subscriber profile server, which for purposes of illustration is assumed to be the subscriber profile server 16. In step 52, the telephony server 14 sends the received telephony number and a request for call routing information to the subscriber profile server 16. In step 54, the subscriber profile server 16 consults the subscriber profile database 18, and uses the received telephony number to retrieve the network address for the telephony subscriber device 8 and the telephony subscriber's custom telecommunication service instructions. The network address and custom telecommunication service instructions are sent back to the telephony server 14 in step 56. In step 58, the network address and custom telecommunication service instructions are received and temporarily stored by the telephony server 14. The telephony server 14 is then ready to begin the call setup procedure by executing the retrieved instructions.

Figure 4:
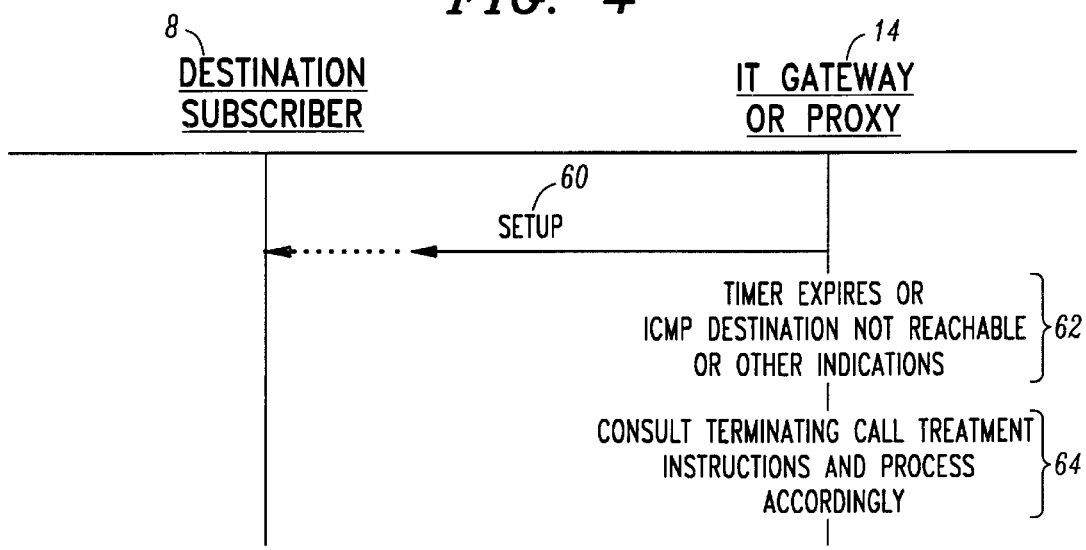
FIG. 4 is a messaging sequence diagram showing a series of call redirection steps implemented in accordance with an exemplary embodiment of the invention in the telecommunication system of FIG. 1.

Turning now to FIG. 4, a call setup example is shown wherein the telephony subscriber's custom telephony instructions provide that the telephony server 14 should first attempt to set up an incoming call to the network address of the telephony subscriber device 8, and thereafter redirect the call to another location if no response is received. Accordingly, the telephony server 14 initiates a call setup attempt to the telephony subscriber device 8 in step 60. The telephony server 14 waits for a response to the call setup attempt until, in step 62, a timer expires or a message is returned advising that the telephony subscriber device 8 cannot be reached. The latter could be an Internet Control Message Protocol (ICMP) "destination not reachable" message, or the like. The inability to establish a call connection to the telephony subscriber device 8 could be due to the device being disconnected from the data network 4, the device being already engaged in a data network telephony call (e.g., "busy"), or other circumstances.

In step 64, the telephony server 14 acts in accordance with the telephony subscriber's custom telecommunication instructions to reroute the call to an alternative destination. This could be another data network address, a PSTN number, a voice mail address, a pager, a facsimile machine (if the originating subscriber equipment is a facsimile machine) or any other destination specified by the telephony subscriber. In this way, the call is handled in an appropriate manner and the caller is afforded the option of taking an appropriate alternative communication action.

Accordingly, a system and method for remote activation of customized telecommunication services for data network telephony subscribers has been described. While various embodiments have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a data network providing telephony services to data network telephony subscribers, a method for remote activation of customized telecommunication services on behalf of said telephony subscribers, comprising the steps of:

receiving a call from an originating caller for a telephony subscriber in said data network;

retrieving custom telecommunication service instructions provided by said telephony subscriber and stored remotely from said telephony subscriber's point of presence on said data network; and routing said call according to said custom telecommunication service instructions.

2. A method in accordance with claim 1 wherein said receiving and routing steps are performed by a data network telephony server operating in said data network.

3. A method in accordance with claim 2 wherein said telephony server is a gateway that connects said data network to the Public Switched Telephone Network (PSTN).

4. A method in accordance with claim 2 wherein said retrieval step includes said telephony server retrieving said custom telecommunication service instructions in advance of performing said routing step from a permanent storage location.

5. A method in accordance with claim 4 wherein said retrieval step includes retrieving said custom telecommunication service instructions from a subscriber profile server maintaining a subscriber profile database.

6. A method in accordance with claim 5 wherein said retrieval step further includes retrieving a data network address assigned to said telephony subscriber from said subscriber profile server.

7. A method in accordance with claim 6 and further including a registration step wherein said data network address is provided to said subscriber profile server in advance of said call routing step.

8. A method in accordance with claim 7 wherein said registration step includes providing said network address to said subscriber profile server and mapping pre-stored subscriber identification and telephony number information against said network address.

9. A method in accordance with claim 8 wherein said registration step further includes providing said network address to said subscriber profile server via a registration server.

10. A method in accordance with claim 9 wherein said registration server dynamically allocates said data network address on behalf of said telephony subscriber and provides said data network address to said subscriber profile server as part of said registration step.

11. In a data network providing telephony services to data network telephony subscribers, a system for remote activation of customized telecommunication services on behalf of said telephony subscribers, comprising:

means for receiving a call from an originating caller for a telephony subscriber in said data network;

means for retrieving custom telecommunication service instructions provided by said telephony subscriber and stored remotely from said telephony subscriber's point of presence on said data network; and means for routing said call according to said custom telecommunication service instructions.

12. A system in accordance with claim 11 wherein said call routing means is a data network telephony server operating in said data network.

13. A system in accordance with claim 12 wherein said telephony server is a gateway server that connects said data network to the Public Switched Telephone Network (PSTN).

14. A system in accordance with claim 12 wherein said telephony server is configured for retrieving said custom telecommunication service instructions in advance of making said call setup attempt from a permanent storage location.

15. A system in accordance with claim 14 wherein said telephony server is configured for retrieving said custom telecommunication service instructions from a subscriber profile server maintaining a subscriber profile database.

16. A system in accordance with claim 15 wherein said telephony server is further configured for retrieving a data network address assigned to said telephony subscriber from said subscriber profile database.

17. A system in accordance with claim 16 and further including registration means for providing said data network address to said subscriber profile server in advance of said routing step.

18. A system in accordance with claim 17 wherein said registration means includes means for providing said network address to said subscriber profile server and mapping pre-stored subscriber identification and telephony number information against said network address.

19. A system in accordance with claim 18 wherein said registration means includes a registration server for providing said network address to said subscriber profile server.

20. A system in accordance with claim 19 wherein said registration means includes means for dynamically allocating said data network address on behalf of said telephony subscriber and providing said data network address to said subscriber profile server.

21. In a data network serving data network telephony subscribers, a method for remote activation of customized telecommunication services on behalf of said telephony subscribers, comprising the steps of:

providing a data network telephony server in said data network to act as a telephony proxy in said data network and as a gateway between said data network and the Public Switched Telephone Network (PSTN);

providing a subscriber profile server in said data network, said subscriber profile server maintaining a subscriber profile database containing pre-stored subscriber information and custom telecommunication service instructions on behalf of said telephony subscribers;

providing a registration server in said data network;

controlling said registration server to communicate a data network address on behalf of said telephony subscriber to said subscriber profile server;

controlling said telephony server to request said data network address and said custom telecommunication service instructions from said subscriber profile server for said telephony subscriber in response an incoming call request to said telephony subscriber;

controlling said telephony server to initiate a call setup attempt to said telephony subscriber using said call setup information;

controlling said telephony server in response to said call setup attempt being unable to establish a call connection to said telephony subscriber to route said call to an alternative destination according to said custom telecommunication service instructions.

\* \* \* \* \*

UNITED STATES PATENT AND TRADEMARK OFFICE
CERTIFICATE OF CORRECTION

PATENT NO. : 6,775,368 B2
DATED : August 10, 2004
INVENTOR(S) : Chinmei Chen Lee and Douglas William Varney It is certified that error appears in the above-identified patent and that said Letters Patent is hereby corrected as shown below:

<u>Title page,</u>
Item [54], Title, please delete "SEAMLESS DATA NETWORK TELECOMMUNICATION SERVICE DURING MOBILE WIRELESS CALL HANDOFF" and insert the following: -- REMOTE ACTIVATION OF CUSTOMIZED TELECOMMUNICATION SERVICES FOR DATA NETWORK TELEPHONY SUBSCRIBERS --

Signed and Sealed this

Ninth Day of November, 2004

JON W. DUDAS
*Director of the United States Patent and Trademark Office*